March 11, 1969     J. BOUET     3,431,714
CUTTER BAR

Filed Nov. 23, 1965

INVENTOR
JACQUES BOUET
BY
ATTORNEY

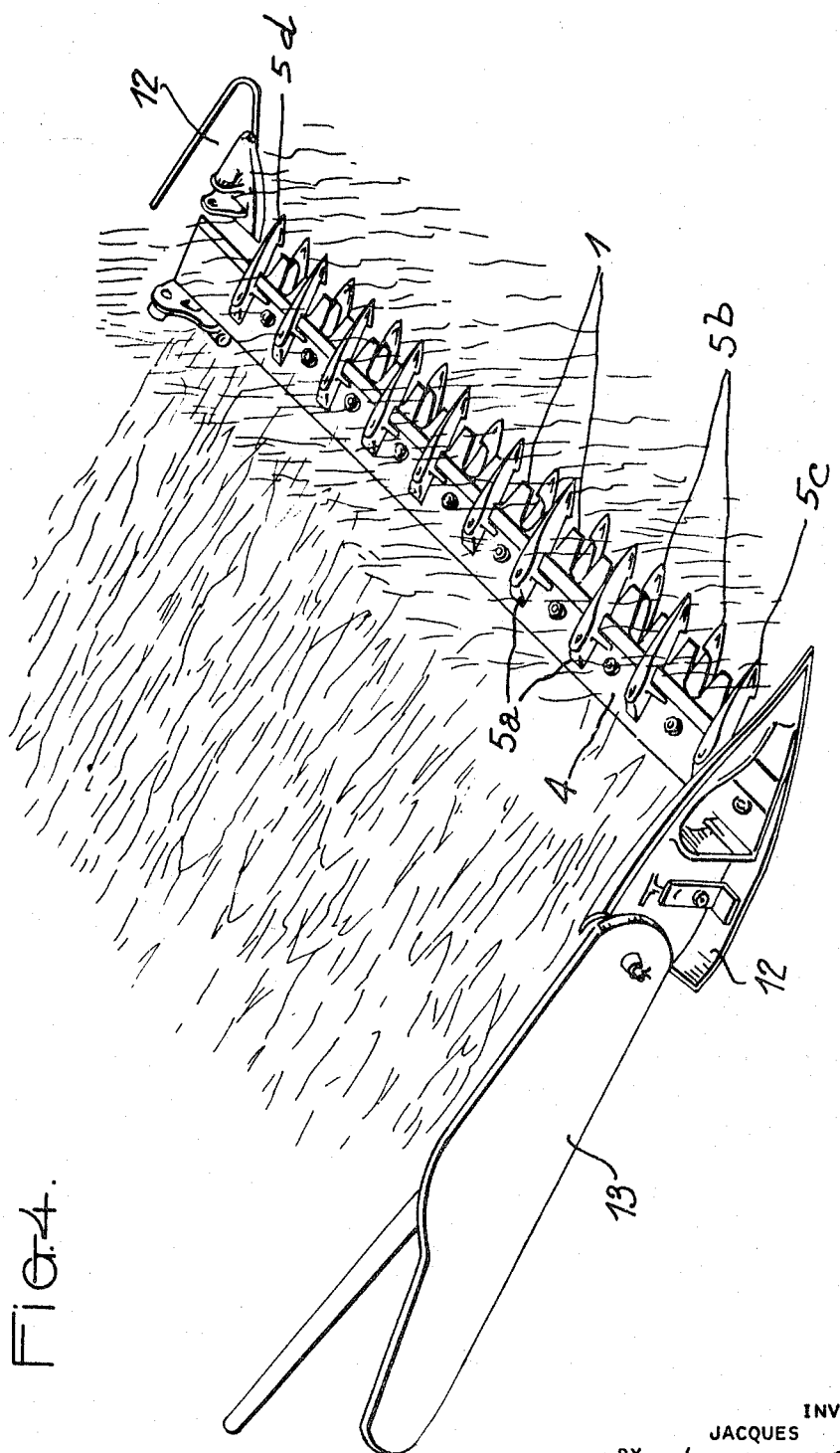

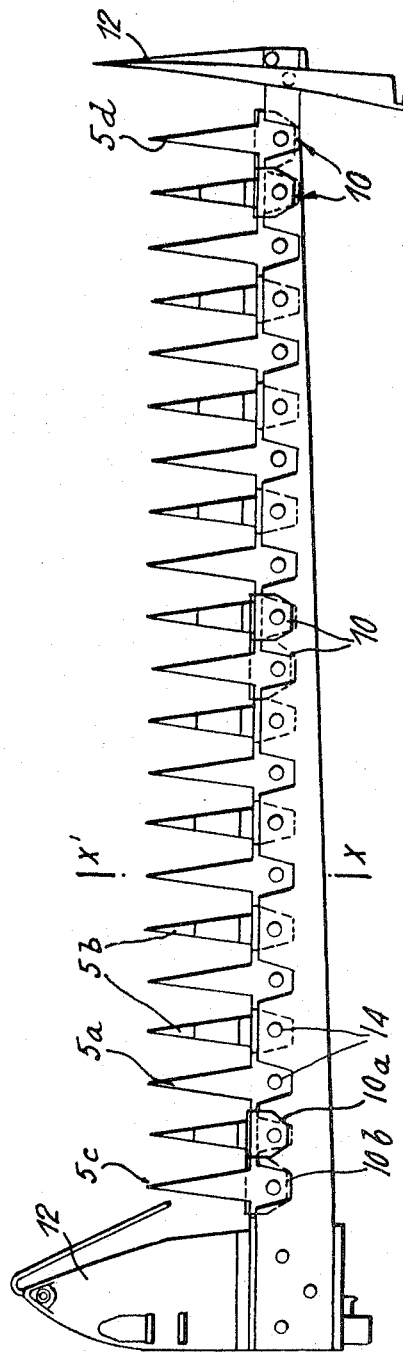
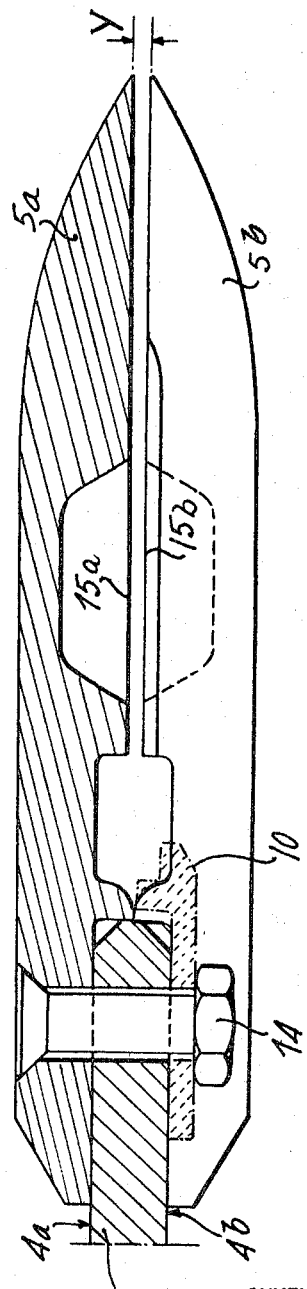

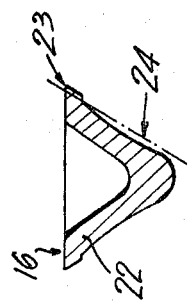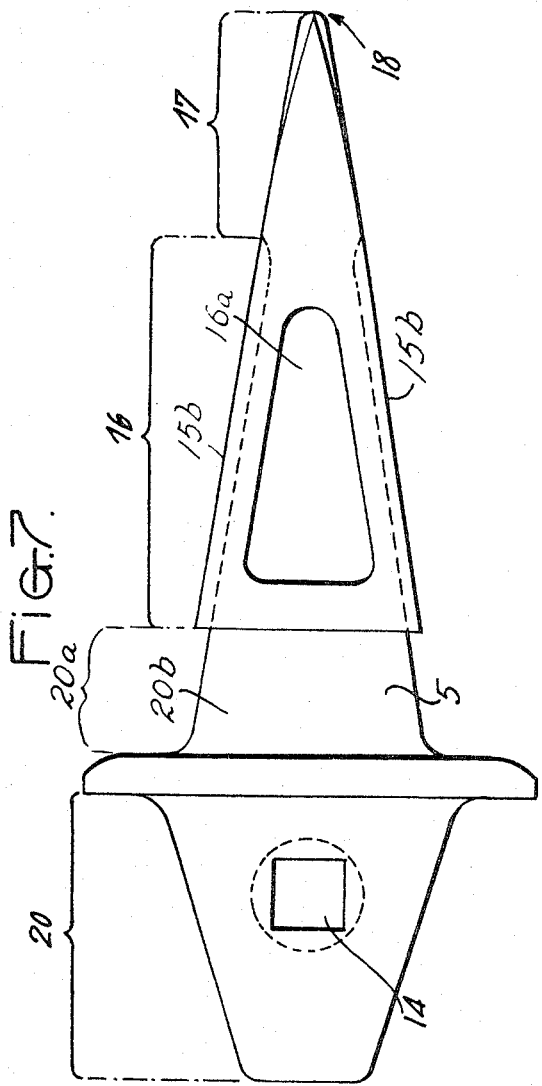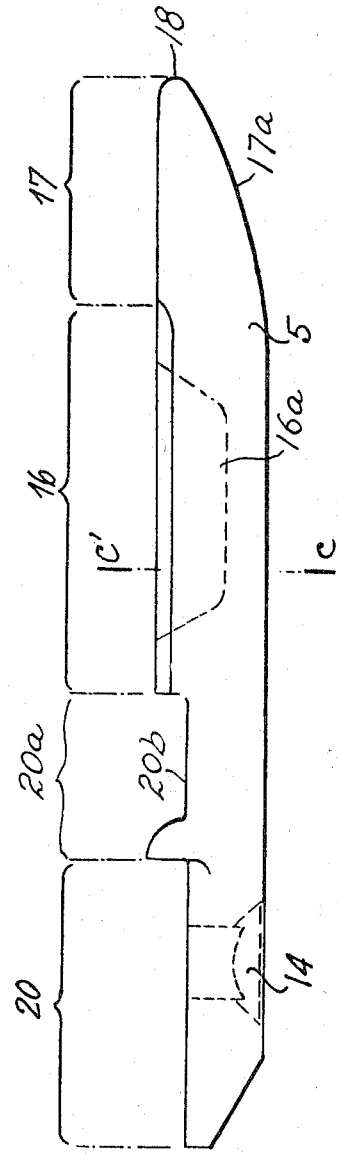

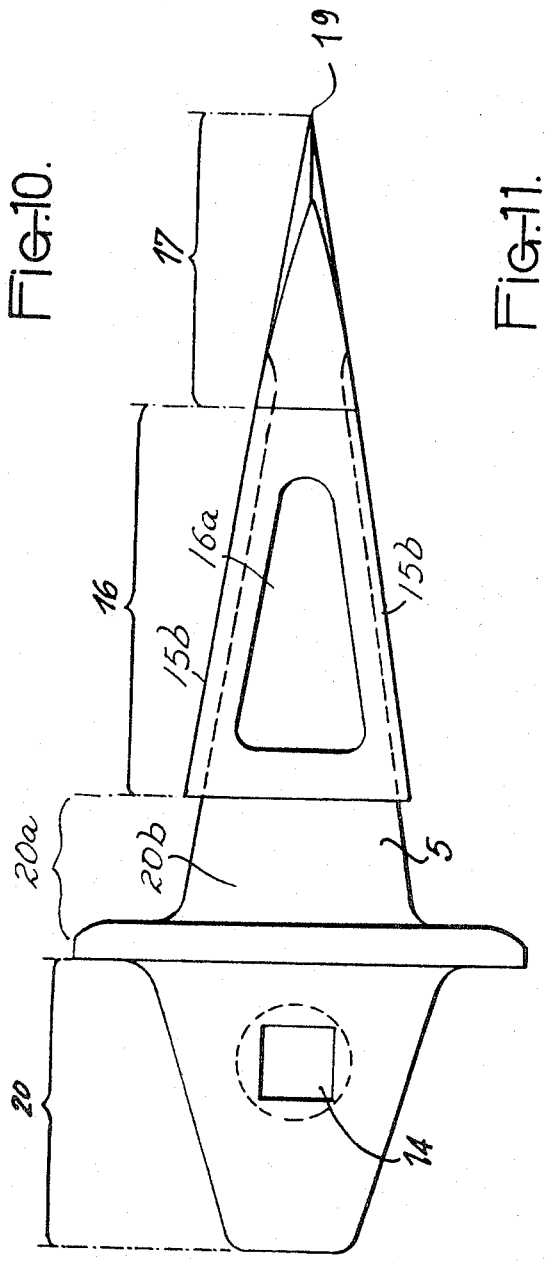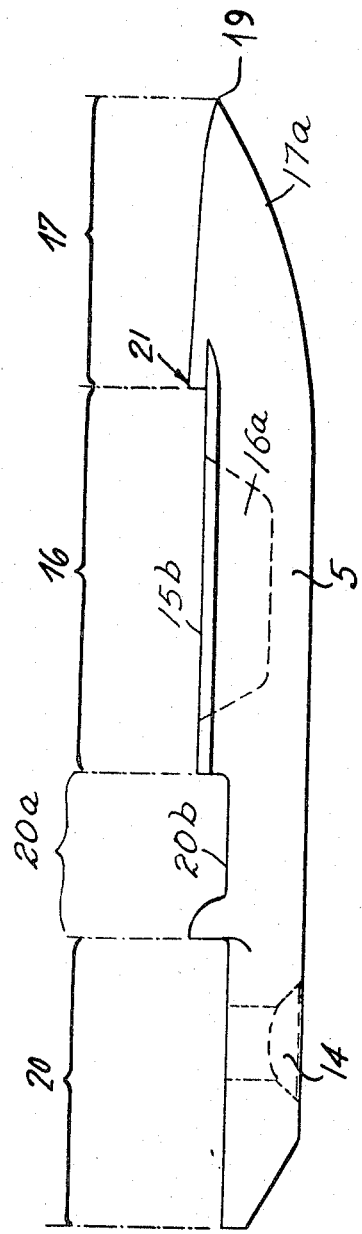

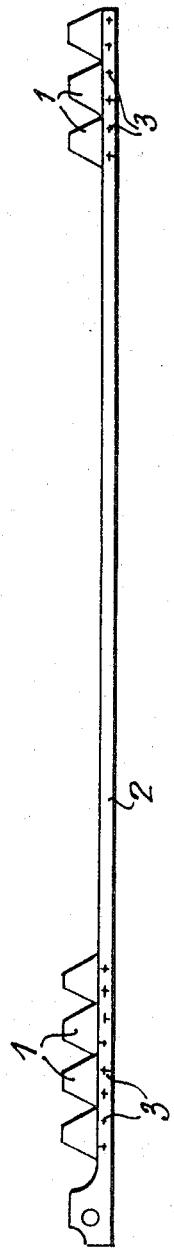
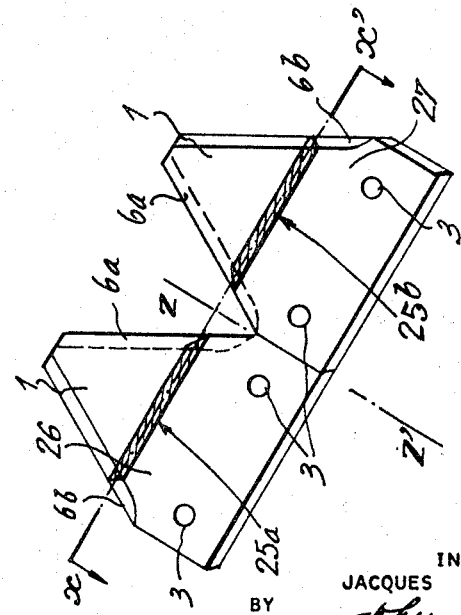

United States Patent Office 3,431,714
Patented Mar. 11, 1969

3,431,714
CUTTER BAR
Jacques Bouet, Tourcoing, Nord, France, assignor to International Harvester Company, Chicago, Ill., a corporation of Delaware
Filed Nov. 23, 1965, Ser. No. 509,326
Claims priority, application France, Nov. 25, 1964,
996,301
U.S. Cl. 56—296    15 Claims
Int. Cl. A01d 55/02, 55/10

ABSTRACT OF THE DISCLOSURE

A cutter bar mower having a support bar and mounted thereon seriatim disposed knife guards alternately spaced above and below said bar in lateral disposition and defining a space therebetween and the knife guards defining upper and lower cutting edges respectively adjacent said space, a reciprocating cutter comprising a plurality of laterally related coplanar knife sections having cutting edges, and said cutter constrained and reciprocated between the knife guard space wherein the cutting edges of the knife guards and the reciprocating cutter coact to produce a crop severing shear; and during the shear simultaneously produce oppositely acting forces upon the knife sections to preclude either upward or downward movement of the knife sections from their respective cooperating knife guards.

---

The present invention relates to an improved cutter bar intended, though not restricted, to incorporation in forage harvesters or in harvester thresher machines.

Cutter bars of conventional type are already known and essentially comprise a blade which is reciprocated and which slides in a blade carrier or guards. This latter comprises a supporting bar on which are mounted forwardly directed fingers or guards of tapered shape, and mounted side by side in line like the teeth of a comb and movable over the ground. The blade comprises an alignment of identical cutting sections of triangular shape, fixed by rivets on a supporting bar, the said blade being connected to the driving mechanism.

As the machine moves forward, the plants are directed between the fingers towards the moving sections of the blade, their cutting being effected between the cutting edges of these sections and those provided laterally either on the fingers themselves or on wearing parts, easily replaceable, fixed to the fingers and known as back plates or ledger plates, it being understood that the fingers, whether fitted with ledger plates or not, are fixed with respect to the machine.

During cutting, the blade is subjected by the plants and obstacles which it encounters, to considerable continuous forces which normally tend to lift it with respect to the corresponding fingers, and in consequence to separate the various sections from their associated fingers. For this reason, the cutting of the stalks becomes defective and ineffective, the pure shearing action being partly replaced by tearing.

In order to hold the sections against the fingers or ledger plates thereon, for optimum cutting action, it is standard practice on the one hand to hold the blade thus in shearing contact by guides or clamps mounted along the supporting bar to prevent the sections from lifting and separating from the ledgers. Furthermore, in order to reduce the stresses and to improve the uniformity of cutting, there is provided an overlap of the ledger plate or of the working part of the finger by a member in the form of a lip on the finger.

All the different guiding devices or hold down clamps are however subject to wear, with the result that after certain working time play occurs between the blade and the fingers, which substantially reduces the cutting efficiency for the reasons already indicated above, namely, vertical separation. In addition, this separation between the sections and the fingers, and more particularly in the zones without blade guides, may cause the sections to interfere in their travel with the lips of the corresponding fingers, and this may lead either to the fracture of the section or its deriveting, or the fracture of the finger.

The present invention overcomes these drawbacks. It has for its object to provide a cutter bar of simple and rugged construction, not requiring the provision of blade guides and ensuring a uniform cutting of the stalks. A further object of the invention is to obtain a cutter blade having exceptional torsional strength, and perfect balance by reason of the elimination of the cutting reactions from one finger to the other, and an improved performance of the sections as regards loosening of the rivets.

The cutter bar according to the invention is of the type comprising a movable blade sliding in the interior of a blade carrier provided with fixed fingers, and is essentially characterized by the fact that the fingers are fixed alternately on the upper and lower faces of the supporting bar of the blade carrier, so that their working parts face each other, this arrangement ensuring continuous guiding of the blade by each finger acting as a blade guide.

In accordance with other charactertistic features of the invention:

The ratio between the number of fingers provided on each of the faces is other than 1.

Wearing plates carefully distributed over the whole length of the bar are also arranged and fixed alternately on the upper and lower faces of the supporting bar, opposite the corresponding fingers, and are intended to retain the blade in such manner as to compensate for the thrust due to contact with the plants during the forward movement of the cutter bar.

Shoes of conventional type provided with skids, the position of which determines the height of cut, are provided on each extremity of the cutter bar.

The end fingers are fixed on the upper face of the supporting bar since they correspond to the shoes which can be considered as fingers mounted on the lower face of the same bar.

The fingers may or may not be fitted with ledger plates, the fingers without ledger plates being such that their lateral cutting edges can be easily re-sharpened during use, the parts of the body of the finger located under the working faces being recessed for this purpose with respect to the cutting edges.

The fingers with ledger plates have shapes similar to the first, the ledger plate being fixed to the finger by one or a number of rivets;

The fingers with or without ledger plates are not provided with any lip overlapping the working portion or with lateral fins intended to limit the penetration of the plants whereby greatly facilitating manufacture.

The sections of triangular shape which form the blade and which are aligned side by side on a rigid support are provided, in a first form of embodiment, with cutting edges arranged alternately on one and the other face of the section, two consecutive sections corresponding respectively to two fingers located on the upper and lower faces of the supporting bar being symmetrical with respect to their line of separation.

The cutting edges of the section may be straight or curved like a sickle.

In another form of embodiment, the sections are not provided with any beveled cutting edge on their working parts.

Other characteristic features, advantages and particular aspects of the present invention will be brought out from the description which follows below, reference being made to the accompanying drawings, in which:

FIG. 4 is a general view in perspective of one form of construction of a cutter bar in accordance with the invention;

FIGS. 5 and 6 represent respectively a plan view and a transverse section to a larger scale taken along the line X–X' of a cutter bar similar to FIG. 4 and bringing out essentially an arrangement according to the invention of the fingers on the supporting bar;

FIGS. 7 and 8 show respectively a view in plan and a view in elevation of another form of construction of a finger according to the invention;

FIG. 9 shows a transverse section taken along the axis C–C' of FIG. 8;

FIGS. 10 and 11 show respectively a view in plan and a view in elevation of another form of construction of the same finger according to the invention;

FIG. 12 shows diagrammatically an arrangement of the sections of the blade which can be employed in a cutter bar according to the invention;

FIGS. 13 and 14 show two consecutive sections of a blade in accordance with the invention, respectively with and without cutting edges.

Figure 1:
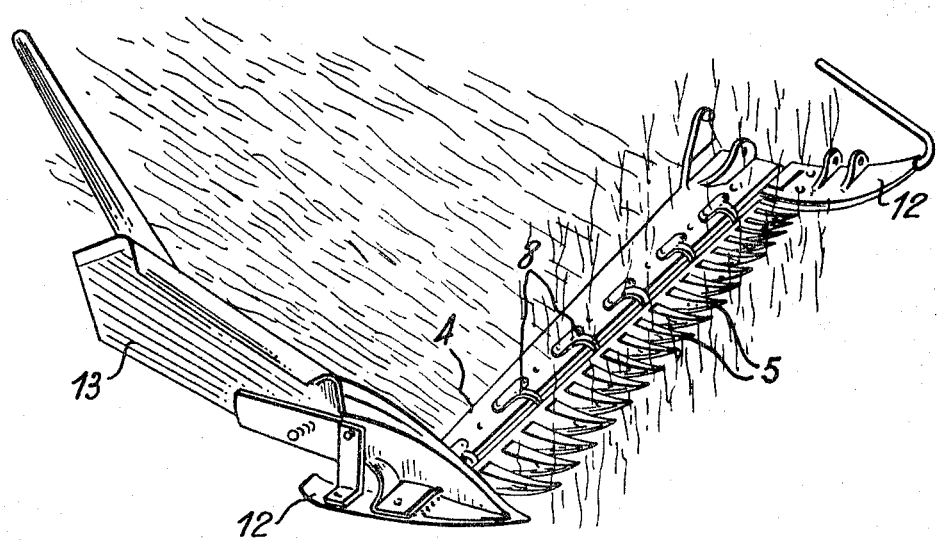
FIG. 1 represents a general view in perspective of a conventional cutter bar, comprising blade guides of well known form.
Figure 2:
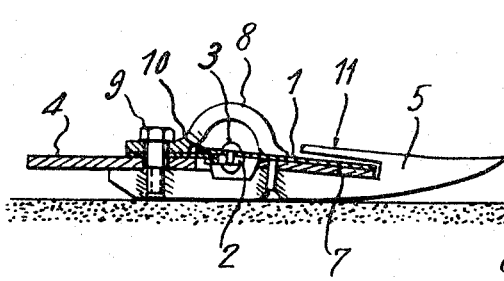
FIGS. 2 and 3 show respectively in transverse section and in fragmentary plan, a conventional arrangement of the fingers, the sections of the blade and the guides, as employed in the cutter bar illustrated in FIG. 1.
Figure 3:
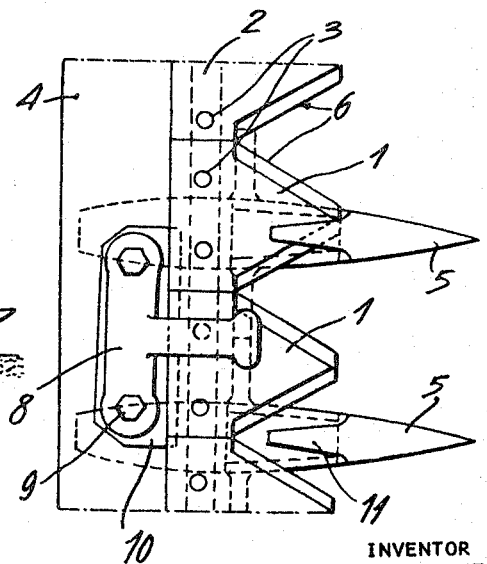

In FIGS. 1 to 3, there is shown a cutter bar of conventional type comprising a blade comprising a series of cutting sections 1 of triangular shape, assembled side by side on a support bar 2 by means of rivets 3. The blade carrier comprises a supporting bar 4 on which are fixed the fingers 5 having a forwardly tapered shape. These fingers are able to slide along the ground and being intended on the one hand to guide the plants towards the reciprocating blade, and on the other hand to cut them off after wedging them between the cutting edges 6 of the moving section 1 and the laterally-disposed cutting edges on the fixed fingers or alternatively on each ledger plate 7 fixed to the finger, in the case where this latter is provided with such a readily replaceable wearing part.

In consequence, each section works alternately on the one and the other of its cutting edges 6 in contact with the cutting edge of the corresponding finger, the travel of the blade, or of each section, being equal to the pitch of the fingers (so-called normal bars), greater than half (so-called intermediate bars) or double (so-called Danish bars).

Blade guides or hold-down clips 8 distributed along the length of the supporting bar 4 ensure the support of the sections on the ledger plate of the fingers or on the fingers themselves, and are fixed to the bar 4 by bolts 9. Wearing plates 10 maintain the blade in position and are intended to withstand the thrust applied on the sections in contact with the plant stalks as the machine moves forward.

In FIGS. 2 and 3 in particular, there are shown the overlapping lips 11 of the working parts of the fingers, these lips being intended to keep the plants as far as possible vertical with respect to the lateral shearing force. In FIG. 1, there are shown the two shoes 12 at the extremity of the cutter bar together with a swathe-board 13 on one of the sides.

FIGS. 4, 5 and 6 show a general view of one preferred form of construction according to the invention, of a cutter bar, the substantially identical fingers or knife guards 5a and 5b of which are alternately and respectively fixed on the upper face 4a and lower face 4b of the supporting bar 4 of the blade-carrier, their working faces or upper and lower cutting edges 15a and 15b respectively being opposite each other and their fixing to the support being effected in the usual manner by bolts 14. Wearing plates 10a and 10b (FIGURE 5) are also disposed appropriately along the bar and are alternately fixed by means of bolts opposite the corresponding fingers 5b and 5a respectively.

The end fingers 5c and 5d are fixed on the upper face 4a of the supporting bar 4, the shoes 12 being regarded as fingers arranged on the lower face 5b of the supporting bar.

As shown particularly in FIG. 6, the blade (not shown for the sake of clearness in FIGS. 5 and 6) slides without a large clearance in the space Y between the working faces of the fingers 5, thus ensuring a pure shearing action on the stalks to be cut. The travel of the blade or knife section in the cutter bar according to the invention is at least equal to or greater than the pitch of the fingers, it being understood that the ratio of the number of fingers fitted on each of the faces 4a and 4b of the supporting bar may be different from that of FIGS. 4 and 5 which corresponds to the advantageous case in which this ratio is equal to 1. In the case for example in which the above ratio is 1/2, an upper knife guard or finger 5a or lower 5b corresponds respectively to two lower knife guards or fingers 5b, or upper knife guards or fingers 5a.

FIGS. 7, 8 and 9 on the one hand and 10 and 11 on the other represent two forms of possible construction of fingers which can be utilized in a cutter bar according to the invention.

These forms furthermore, may or may not comprise ledger plates with or without beveled cutting edges, these ledger plates not being shown in the figures referred to above for the sake of clearness.

As shown in the above-mentioned figures, the fingers utilized in the invention do not comprise a lip overlapping their working portion 16 or cutter bar guide surface, which is extended towards the front by a forward tapered portion or upper planar surface 17 and upwardly curved bottom surface 17a each having an optimum profile and terminating in a slightly rounded extremity or leading point 18 as shown in FIGS. 7 and 8, or by a pointed extremity 19, as shown in FIGS. 10 and 11. The fixing plane or anchoring portion 20 of the fingers on the supporting bar 4 is parallel to the supporting face 16 of the sections, which is extended by the extremities 18 or 19 of the finger. In addition, the fixing of the fingers to the supporting bar is effected in known manner by bolts 14. Ahead of surface 20 is an intermediate cutter bar mounting portion 20a having a transverse guideway 20b for supporting the cutter bar 2.

In FIG. 11 there has been shown as a possible form of construction of these fingers according to the invention, a tapered form 17 having a widened portion 21 at its junction with the working part of supporting face 16 which has an upwardly opening central recess 16a therein.

This wider portion 21, having a height approximately equivalent to the thickness of a section is intended to prevent as far as possible the accumulation of material between the working part 16 and the section 1.

As clearly shown in FIG. 9, representing in cross-section C–C' of FIG. 8, a possible form of the body of the finger or knife guard, the portions 22 located under the working face 16 of the finger 5 without ledger plate are substantially recessed with respect to the lateral cutting edges 23, so as to permit them to be resharpened during the course of use, up to the line 24, without altering in any way the quality of the finger.

FIGS. 12, 13 and 14 show the blade and its different sections.

FIG. 12 shows the conventional mounting of the sections 1 of triangular shape, fixed side by side by rivets 3, in general two per section, on a rigid support 2 formed in any known manner, for example by means of two identical backing bars between which the sections are clamped, this mounting ensuring adequate torsional strength of the blade and preventing possible unriveting of sections, due to the fact that four rivet surfaces must be sheared in order to separate a section from its support.

In the cutter bar according to the invention, the sections forming the blade may or may not comprise bevel formed cutting edges. In fact, in a first form of construction shown diagrammatically in FIG. 13, the sections 1 have a cutting edge on their useful parts 6a and 6b, 6a being a lower bevel or cutting edge and 6b an upper bevel or cutting edge. In the case shown in FIGS. 4, 5 and 6, in which according to the invention, the fingers or knife guards are fixed alternately in equal numbers on the upper and lower face of the supporting bar, each section then cooperatitng on one of its sides 6b with a lower finger 5b, and on the other side 6a with an upper finger 5a, the cutting surfaces 25a and 25b are arranged alternately on the one and the other face of the section, as clearly shown by the section x–x' in FIG. 13. In this case, two consecutive sections are symmetrical with respect to the axis which corresponds to their line of separation z–z'. When according to the invention the number of the upper and lower fingers or knife guards arranged respectively on the upper and lower faces of the supporting bar is not the same, the cutting edges of the sections on the sides 6a and 6b and the sections themselves are correspondingly arranged. It also follows that the end sections of the blade are symmetrical with respect to the central plane of the blade and correspond to the upper fingers of the extremity of the supporting bar; their relative configuration is similar to that shown by the sections 26 and 27 of FIG. 14.

FIG. 14 represents a second form of embodiment according to the invention, of the sections 1, which do not comprise cutting edges on their working parts 6a and 6b as shown by the cross section taken along the line x–x', the shearing of the stalks between the moving section and the fixed finger corresponding, being effected in a manner similar to the case where the section is provided with a cutting edge.

It will of course be understood that the invention has only been described and shown by way of explanation and not in any limitative sense, and that any modification of detail may be made thereto without departing from its scope.

In particular, the single fingers of the cutter bar according to the invention may be replaced by multiple fingers, for example double or triple fingers.

SUMMARY

A cutter bar is of the type which comprising a moving blade sliding inside a blade-carrier provided with fixed fingers or knife guards and characterized essentially by the various points following, taken separately or in their different combinations:

(1) The fingers or knife guards are fixed alternately on the upper and lower faces of a supporting bar belonging to the blade carrier, in such manner that the working parts of the fingers face each other, this arrangement ensuring continuous guiding of the blade, each finger playing the part of a blade guide.

(2) The ratio between the number of fingers fitted on each of the faces of the supporting bar is other than 1.

(3) The fixing of the fingers to the supporting bar is effected by any appropriate means such as bolting.

(4) Wearing plates, judiciously distributed over the whole length of the bar, are fixed by any appropriate means, for example by means of bolts, alternately on the upper and lower faces of the supporting bar opposite the corresponding fingers.

(5) The end fingers are fixed on the upper face of the supporting bar.

(6) The fingers may or may not be provided with ledger plates, but do not comprise any overlapping lip for their working portion.

(7) The fingers are not provided with lateral fins intended to limit the penetration of the stalks of the plants.

(8) The fingers without ledger plates are provided with lateral cutting edges which are easily resharpened, the parts of the body of the finger located under the working faces being substantially recessed with respect to the cutting edges.

(9) The tapered portion towards the front of the finger extending the working portion, has an optimum profile and is terminated either by a slightly rounded extremity or by a pointed extremity.

(10) The tapered extremity of the fingers towards the front is provided at the point of its junction with the working portion with a wider portion having a height approximately equal to the thickness of a section.

(11) The sections of triangular form constituting the blade are fixed side by side by rivets on a rigid support constituted by two identical rods between which they are housed.

(12) The sections cooperating on one of their sides with a finger fixed to the lower face of the bar and on the other side with a finger fixed to the upper face of the same supporting bar are provided with cutting edges arranged alternately on the one and the other face of the section.

(13) The cutting edges of the sections are constituted by smooth or sickle-shaped edges.

What is claimed is:

1. In a mower having, in its normal use arrangement, a generally horizontal support, mowing means comprising:
   a first knife guard carried by said support and having a first, upper cutting edge;
   a second knife guard carried by said support spaced vertically above the laterally from said first knife guard and having a lower, second cutting edge, said guards defining a knife receiving space extending from above said first edge of the first knife guard to below said second edge of the second knife guard;
   a knife section in said space and having a third, lower cutting edge adjacent said first cutting edge of the first knife guard and a fourth, upper cutting edge adjacent said second cutting edge of the second knife guard; and
   means for horizontally reciprocating said knife section seriatim to cause said third edge to move cuttingly past said first edge while said second knife guard substantially precludes upward movement of said knife section away from said first edge and said fourth edge to move cuttingly past said second edge while said first knife guard substantially precludes downward movement of said knife section away from said second edge.

2. The mowing means of claim 1 wherein said knife guards comprise fingers portions having said cutting edges formed in the body thereof.

3. The mowing means of claim 1 wherein said knife section edges comprise beveled cutting edges.

4. The mowing means of claim 1 wherein the vertical spacing between said guards is substantially equal to the thickness of said knife section.

6. The mowing means of claim 1 wherein said first and second knife guards are reversely identical.

6. The mowing means of claim 1 wherein said third, cutting edge comprises a lower edge at one side of the knife section and said fourth, cutting edge comprises a lower edge at the opposite side thereof, said cutting edges being angled with respect to the plane of movement of said knife section.

7. In a mower having, in its normal use arrangement, a generally horizontal support, mowing means comprising:
  a first knife guard carried by said support and having a first, upper cutting edge;
  a second knife guard carried by said support spaced vertically above the laterally from said first knife guard and having a lower, second cutting edge, said guards defining a knife receiving space extending from above said first edge of the first knife guard to below said second edge of the second knife guard;
  cutter means including a plurality of laterally related, generally coplanar knife sections in said space defining a third edge movable adjacent said first cutting edge of the first knife guard and a fourth edge movable adjacent said second cutting edge of the second knife guard; and
  means for horizontally reciprocating said cutter means to cause said third edge to move cuttingly past said first edge while said second knife guard precludes upward movement of said cutter means away from said first edge and said fourth edge to move cuttingly past said second edge while said first knife guard precludes downward movement of said cutter means away from said second edge.

8. The mowing means of claim 7 wherein said knife sections are paired, with a pair of knife sections being disposed one each adjacent opposite sides of each guard, the confronting edges of the pair being similarly arranged for cutting action with the guard when reciprocated respectively past the cutting edges thereof.

9. The mowing means of claim 6 wherein said confronting edges comprise reversely beveled cutting edges.

10. The mowing means of claim 6 wherein said confronting edges comprise squared edges.

11. The mowing means of claim 7 wherein each of said knife sections includes opposite edges, one of said opposite edges being beveled upwardly and the other being beveled downwardly to define respectively said third and fourth edges.

12. The mowing means of claim 7 wherein the center-to-center distance between said guards is substantially equal to the center-to-center distance between said knife sections.

13. The mowing means of claim 7 wherein said guards are centered between each pair of adjacent knife sections.

14. The mower of claim 7 wherein a plurality of first and second knife guards are provided alternating seriatim along said support.

15. A knife guard comprising an elongated body having a forward finger portion, an intermediate cutter bar mounting portion, and a rearward guard anchoring portion, said intermediate portion having a transverse guideway for supporting a cutter bar, said finger portion tapering laterally generally uniformly forwardly from said intermediate portion and cooperating with an upwardly curved bottom surface to define a leading point at the forward end thereof, said finger portion having an upper surface at the forward end thereof, a generally planar cutter bar guide surface rearwardly of and below said upper surface and having an upwardly opening central recess therein, and cutting edges at opposite sides of said cutter bar guide surface.

References Cited

UNITED STATES PATENTS

| | | | |
|---|---|---|---|
| 741,642 | 10/1903 | Evans | 56—298 |
| 778,404 | 12/1904 | Cook | 56—298 |
| 888,491 | 5/1908 | Hampton | 56—305 |
| 1,789,781 | 1/1931 | Seidel | 56—298 |
| 3,171,242 | 3/1965 | Scarnato et al. | 56—310 |

FOREIGN PATENTS

| | | |
|---|---|---|
| 106,030 | 6/1907 | Canada. |
| 312,319 | 6/1931 | Canada. |

ALDRICH F. MEDBERY, *Primary Examiner.*

U.S. Cl. X.R.

56—298, 311